United States Patent
Gharat et al.

(10) Patent No.: US 7,953,744 B2
(45) Date of Patent: May 31, 2011

(54) DATABASE CHANGE VERIFIER

(75) Inventors: Satish M. Gharat, Maharashtra (IN); Hrushikesh Digambar Kulkarni, Maharashtra (IN); Subhadip Niyogi, Pin (IN); Siddhartha Sood, Uttaranchal (IN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/360,935

(22) Filed: Jan. 28, 2009

(65) Prior Publication Data
US 2010/0192006 A1      Jul. 29, 2010

(51) Int. Cl.
*G06F 17/30* (2006.01)
(52) U.S. Cl. .......................... 707/758; 707/761
(58) Field of Classification Search ........... 707/758–769
See application file for complete search history.

(56) References Cited

U.S. PATENT DOCUMENTS

| | | | | |
|---|---|---|---|---|
| 5,499,365 | A * | 3/1996 | Anderson et al. | 717/122 |
| 6,286,001 | B1 * | 9/2001 | Walker et al. | 707/697 |
| 6,460,036 | B1 * | 10/2002 | Herz | 707/748 |
| 7,373,365 | B2 * | 5/2008 | Varadarajan et al. | 382/306 |
| 2010/0318806 | A1 * | 12/2010 | Hardt | 713/176 |

FOREIGN PATENT DOCUMENTS

| | | |
|---|---|---|
| KR | 20030035336 | 5/2003 |
| WO | WO2007-068279 | 6/2007 |

OTHER PUBLICATIONS

Teniente et al.; SVT: Schema Validation Tool for Microsoft SQL-Server; Proceedings of the 30th VLDB Conference, Toronto, Canada, 2004; pp. 1349-1352.
David Martinenghi; Advanced Techniques for Efficient Data Integrity Checking; Ph. D. Dissertation; Roskilde University, Department of Computer Science, Oct. 2005; < URL: http://www.rucsdigitaleprojektbibliotek.dk/bitstream/1800/1594/1/Adanced_techniques_for.pdf >; 152 pages.
Thomas Kyte; Summary of "Optimizer Plan Stability"; Expert Oracle [online], 2005; [Retrieved Aug. 28, 2008]; Retrieved from the Internet: < URL: http://www.springerlink.com/index/v488u34274h09255.pdf >; 2 pages.
Jason Hunter; Updating XQuery; Oracle Technology Network [online]; [Retrieved Aug. 28, 2008]; Retrieved from the Internet < URL: http://www.oracle.com/technology/oramag/oracle/03-nov/o63dev_vml.html >; 14 pages.

(Continued)

*Primary Examiner* — Wilson Lee
(74) *Attorney, Agent, or Firm* — Schmeiser, Olsen & Watts; John Pivnichny

(57) ABSTRACT

A method and system for automatically verifying a change to a database. An input file including a test query for the database and an expected output from executing the test query is received. The test query is automatically executed on the database. An actual output resulting from executing the test query is retrieved. Based on a comparison between the actual output and the expected output, a match or mismatch between the actual output and the expected output is automatically identified. If a mismatch is identified, a failure indication is stored that indicates that the database change is invalid and that the database change may initiate a defect in an application coupled to the database. In one embodiment, the change to the database is a change in a services engagement. In one embodiment, the test query is automatically generated in the method and system described above.

20 Claims, 10 Drawing Sheets

OTHER PUBLICATIONS

Guo et al.; Abstract of LUBM: A benchmark for OWL knowledge base systems; Web Semantics: Science, Services and Agents on the World Wide Web, vol. 3, issues 2-3, Oct. 2005, Selected Papers from the International Semantic Web Conference, 2004—ISWC, 2004; Elsevier B.V. 2005 [online]; [Retrieved Aug. 28, 2008]; Retrieved from the Internet < URL: http://linkinghub.elsevier.com/retrieve/pii/S157086805000132 >; 3 pages.

* cited by examiner

US 7,953,744 B2

DATABASE CHANGE VERIFIER

FIELD OF THE INVENTION

The present invention relates to a technique and tool for verifying database changes and more particularly to a technique and tool for verifying database changes for services engagements.

BACKGROUND OF THE INVENTION

During the lifecycle of web development projects, application database changes occur that are either structural changes or changes to data in particular tables. Database changes are made, but human error (e.g., by a database administrator) that fails to propagate database changes to subsequent environments introduces defects in the application. The defects may bring down a web page or a website may work in an unexpected way. Conventional techniques for verifying database changes include manual verification of database changes in every environment, from local environment to test environment, and to production environment until the application is delivered. Such manual verifications are labor-intensive, expensive, require high-level skills, and are prone to human error. Other conventional verification techniques that compare an installed schema with a last working schema lack support for one or more types of database verification, and therefore have limited ability to test certain aspects of a database change. Thus, there exists a need to overcome at least one of the preceding deficiencies and limitations of the related art.

SUMMARY OF THE INVENTION

In first embodiments, the present invention provides a computer-implemented method of automatically verifying a change to a target database. The method comprises:

a computer system receiving an input file that indicates a change to a target database, wherein the input file includes a test query for the target database and a predefined output expected from executing the test query on the target database;

the computer system automatically executing the test query on the target database subsequent to receiving the input file;

the computer system retrieving an actual output resulting from automatically executing the test query;

the computer system comparing the actual output with the predefined output;

the computer system automatically identifying a mismatch between the actual output and the predefined output based on a result of comparing the actual output with the predefined output; and the computer system storing an indication of a failure in a computer data storage unit, wherein the failure indicates the mismatch, and wherein the failure further indicates that the change to the target database is invalid and the change to the target database initiates a defect in an application coupled to the target database.

In second embodiments, the test query in the above-summarized method is automatically generated.

A system, computer program product, and process for supporting computing infrastructure corresponding to the above-summarized methods are also described and claimed herein.

In one or more embodiments, the present invention provides a platform-independent technique for automatic database change verification for services engagements that allows for early detection of application defects due to schema or data changes in a database and detection of such defects in any environment (i.e., phase) of an application coupled to the database.

DETAILED DESCRIPTION OF THE INVENTION

Overview

Figure 1:
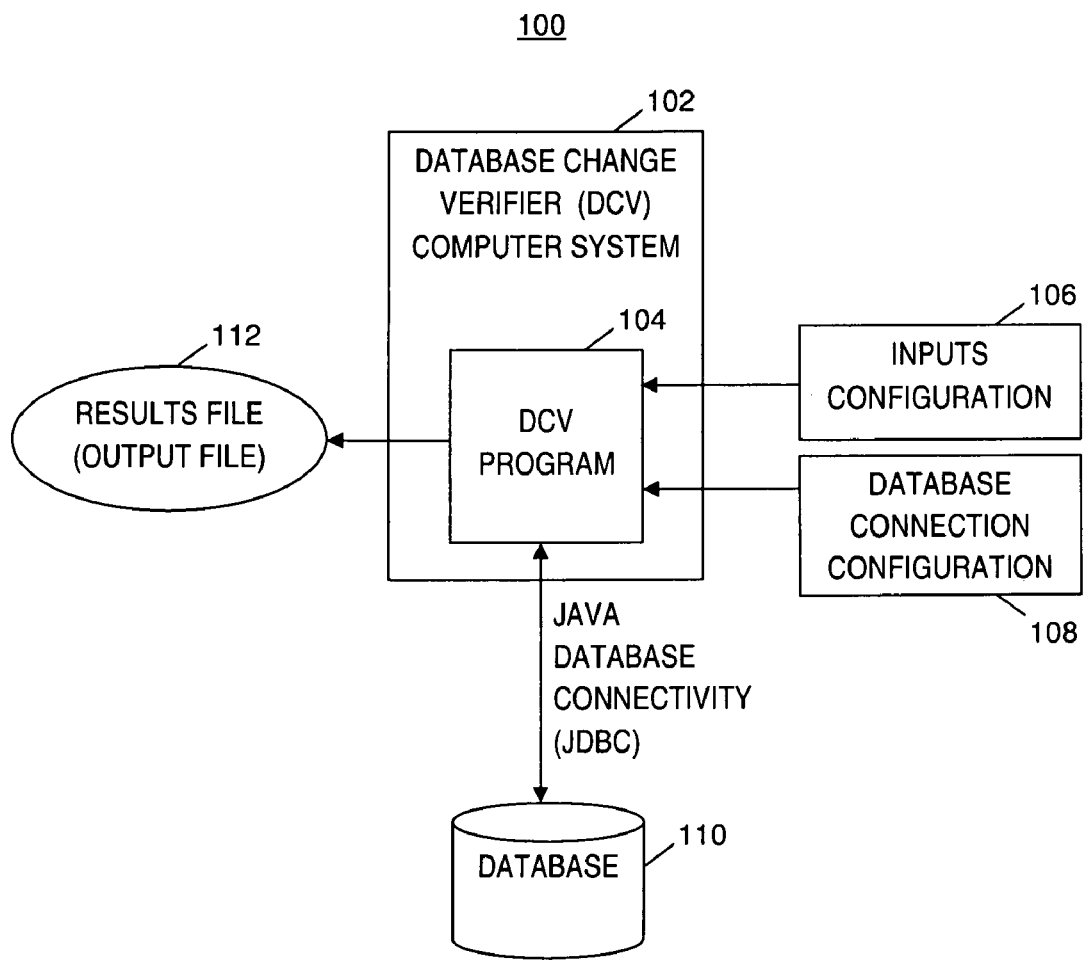
FIG. 1 is a block diagram of a system for automatically verifying database changes, in accordance with embodiments of the present invention.

In one or more embodiments, the present invention may provide a platform-independent technique for automatic verification of database changes for services engagements. In other embodiments, the present invention may provide a platform-independent technique for automatic verification of database changes that is not limited to services engagements. As used herein, a verification of database changes includes a determination that a database change is valid based on predefined expected results or a determination that a database change is invalid based on predefined expected results. The system and method described herein accepts test queries and expected output of the test queries, and executes the test queries on a target database in order to determine if database changes are correct based on whether actual output of the test queries match the expected output. In one embodiment, the test queries are generated and provided by users of the disclosed system. In another embodiment, the test queries are automatically generated and provided by a test query generator. For example, a database change is performed by the following Structured Query Language (SQL) query:

Create table xyz col1, col2, . . .

The test query for this example is "describe table" and the expected output is "table name, column name". It should be noted that embodiments of the present invention base the automatic verification of database changes on test queries and expected output, and therefore differ from known data integrity methods that rely on checksums, cryptographic authentication codes, MD5 hash values, and integrity constraints such as entity integrity, referential integrity, and domain integrity.

The technique disclosed herein may allow for an early detection of application defects due to database schema or data changes, rather than a discovery of defects during later phases of a development project (e.g., during a testing phase, post production delivery phase). Moreover, embodiments of the present invention provide for collective verification of all database changes for a particular application and automatic verification on different environments in the development of an application (e.g., local, development, integration, testing, staging (pre-production), production, etc.). The embodiments of the present invention may reduce or eliminate a need for manual efforts to verify database changes. Furthermore, in one or more embodiments, the verification features of the present invention are beneficial for services engagements in which there is a tight coupling between an application and a database, there are different groups working on a database end and an application end, and/or there are frequent enhancements to database schema or data and same or similar changes are to applied to different environments. Still further, one or more embodiments of the present invention are advantageously employed during deployment of an application so that application code is deployed only in response to determining that database changes are valid by the database change verification process disclosed herein.

As used herein, a database change is a change to a structure (i.e., schema or meta data) of a database or a change to existing data or an existing table of a database. Examples of database changes include creating a new database table, changing a primary key, adding a trigger, inserting a row into an existing table, adding columns to an existing table, and putting critical business configurations in tables. Examples of verifying a database change include verifying whether a new table has been created, validating the structure of a newly added table, determining whether a primary key is correct, determining whether a trigger has been created, determining whether a particular row has been inserted into an existing table, determining whether a particular business configuration is inserted correctly in a particular row of a table, where this business configuration is specific to a particular environment, and verifying if a particular trigger is functionally working by executing the trigger.

As used herein, a database change to meta data is defined as a database change to the schema of a database and includes adding a new table, adding a new column to an existing table, adding a default value on a column, and malting a column nullable.

As used herein, a trigger (a.k.a. database trigger) is defined as procedural code that is executed whenever a particular event happens on a table of a database.

Automatic Database Change Verification System

FIG. 1 is a block diagram of a system for automatically verifying database changes, in accordance with embodiments of the present invention. System 100 includes a database change verifier (DCV) computer system 102 that executes a database change verifier computer program 104 (DCV program). DCV program 104 receives input from an input file included in inputs configuration 106 and a configuration file which contains database connection configuration 108 (e.g., an XML file).

Inputs configuration 106 includes test queries and expected test result data (i.e., expected results of running the test queries; a.k.a. expected output). In one embodiment, the test queries and the expected test result data in inputs configuration 106 are predefined by one or more users. For example, the input file that provides input to DCV program 104 is an Extensible Markup Language (XML) file (e.g. input.xml). The XML input file may have, for example, a Database Change Request (DCR) tag (i.e., <DCR>) that can be used to track the number of database changes associated with a particular requirement. As used herein, a DCR refers to any request for a database change.

In one embodiment, the test queries and expected test result data included in inputs configuration 106 are provided by one or more users of computer system 102. In another embodiment, the test queries are automatically generated.

Database connection configuration 108 includes information required by DCV program 104 to obtain a connection (e.g., Java Database Connectivity (JDBC) connection) to a database 110 (a.k.a. target database). Inputs configuration 106, database connection configuration 108 and database 110 are stored in one or more computer data storage units (not shown) coupled to computer system 102. In one embodiment, the test queries included in inputs configuration 106 are SQL queries and database 110 is capable of executing SQL queries.

Based on input from inputs configuration 106, DCV program 104 selects and fires an appropriate test query to database 110 or receives required meta data from database 110. In one embodiment, DCV program 104 queries database 110 via a JDBC application programming interface (API) (i.e., database 110 is JDBC compliant). DCV program 104 processes the results of the test query or meta data to generate a results file 112 (i.e., an output log file). Results file 112 is a computer data file (e.g., text file) that includes a status (e.g., Success or Failure) of each test query. The functionality of each component of system 100 is described in more detail in the discussion of FIG. 2 presented below.

In one embodiment, system 100 is developed in Java® and utilizes XML files in inputs configuration 106 and database connection configuration 108 so that the system is platform independent.

Automatic Database Change Verification Process

Figure 2:
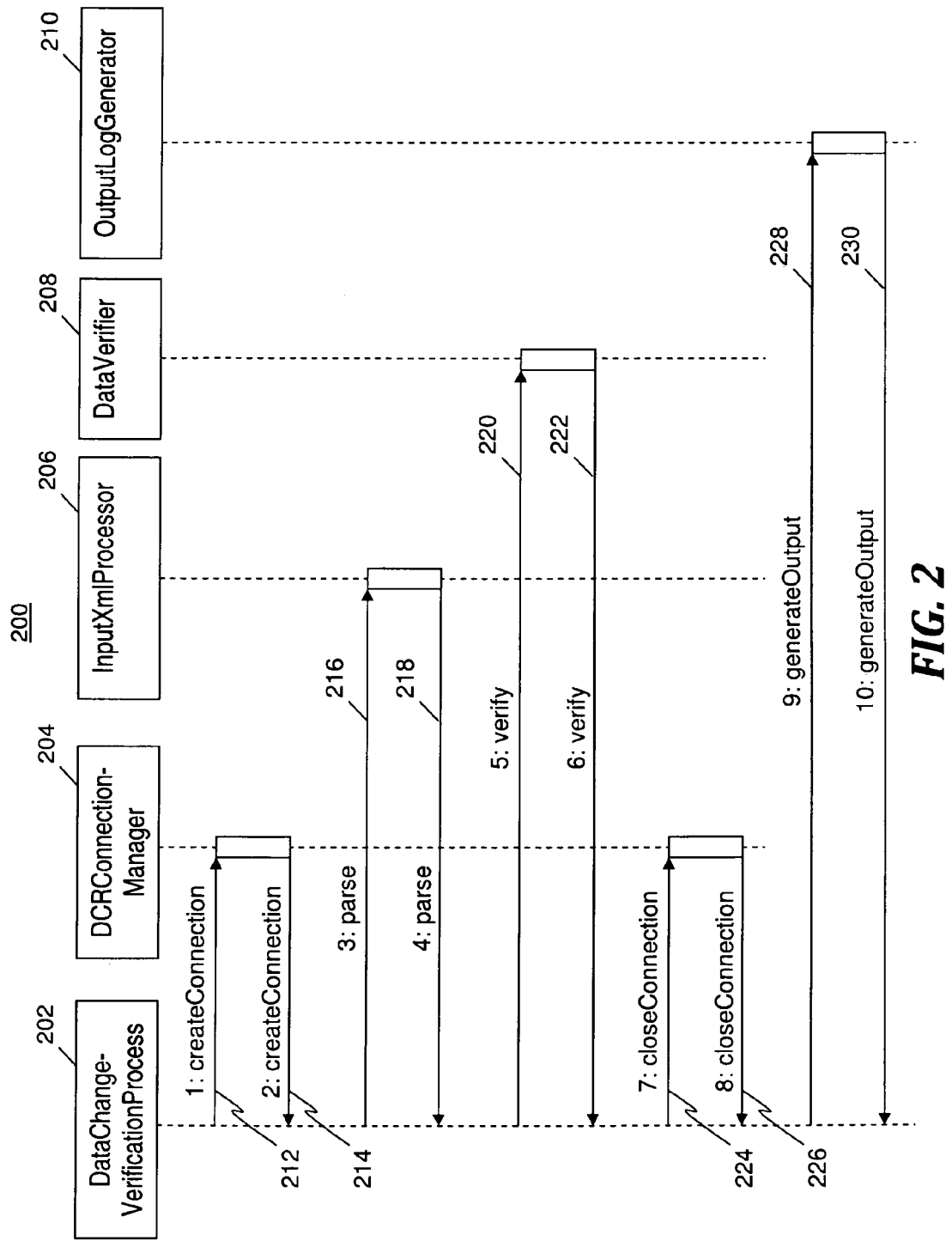
FIG. 2 is a sequence diagram of processes that include a database change verification process implemented by the system of FIG. 1, in accordance with embodiments of the present invention.

FIG. 2 is a sequence diagram of processes that include a database change verification process implemented by the system of FIG. 1, in accordance with embodiments of the present invention. Sequence diagram 200 includes the following objects of DCV program 104: a DataChangeVerificationProcess 202, a DCRConnectionManager 204, an InputXmlProcessor 206, a DataVerifier 208, and an OutputLogGenerator 210.

In one embodiment, prior to step 212, DataChangeVerificationProcess 202 receives the arguments Target Environment, UserName, and Password. The Target Environment argument is the target environment against which the database changes are to be verified. UserName is the User identifier (Userid) used to connect to the target database 110 (see FIG. 1). Password is the password associated with the Userid that is used to connect to the target database. DataChangeVerificationProcess 202 validates the aforementioned arguments. The validation of the arguments includes checking if the arguments provided by the user are null or empty and returning an appropriate error message to the user. Furthermore, the validation of the arguments includes verifying if the Target Environment provided by the user is included in a predefined list of valid environments stored in database connection configuration 108 (see FIG. 1). If DataChangeVerificationProcess 202 determines that the arguments Target Environment, UserName and Password are valid, then DataChangeVerificationProcess 202 performs step 212.

In step 212, DataChangeVerificationProcess 202 retrieves a resource bundle from database connection configuration 108 (see FIG. 1) and sends a createConnection message to DCRConnectionManager 204. The retrieved resource bundle includes database configuration information that allows DCV program 104 (see FIG. 1) to access database 110 (see FIG. 1). In one embodiment, the retrieved resource bundle is based on the target environment and includes a user identifier and password used to connect to database 110 (see FIG. 1). Sending the createConnection message in step 212 requests a connection between DCV program 104 (see FIG. 1) and database 110 (see FIG. 1) using DCRConnectionManager 204. In step 214, DCRConnectionManager 204 establishes the requested connection between DCV program 104 (see FIG. 1) and database 110 (see FIG. 1).

In step 216, DataChangeVerificationProcess 202 sends a message to InputXmlProcessor 206 that results in a retrieval of an input file from inputs configuration 106 (see FIG. 1). InputXmlProcessor 206 reads and parses the retrieved input file in step 216. Also in step 216, InputXmlProcessor 206 retrieves a test query and expected test result data from the parsed input file and stores the retrieved test query and expected test result data in input classes (i.e., data input objects) of a database residing on a computer data storage unit. Examples of input classes are discussed below relative to FIGS. 4A & 4B. In one embodiment, in step 216, DataChangeVerificationProcess 202 identifies a particular type of database change associated with the retrieved test query and expected test result data. The type of database change identified may be a change to (1) master data, (2) meta data, or (3) a database trigger. As used herein, master data is defined as data that is either business configuration data (i.e., data that changes over environments) or base data (e.g., country or currency).

In one embodiment, step 216 includes the DataChangeVerificationProcess 202 creating a hash map of the data input objects. Furthermore, in a first embodiment, a test query retrieved in step 216 is initially generated prior to step 216 by a manual process that provides the test query to inputs configuration 106 (see FIG. 1). In a second embodiment, a test query retrieved in step 216 is generated by an automated process prior to step 216, where the automated process is described below relative to FIG. 7. In a third embodiment, a test query retrieved in step 216 is generated prior to step 216 by the aforementioned manual process or by the aforementioned automated process.

In step 218, InputXmlProcessor 206 sends a response message to DataChangeVerificationProcess 202, where the response message includes the data input objects that include the test query and the expected test result data corresponding to the test query (i.e., the results of parsing the input file).

In step 220, DataChangeVerificationProcess 202 sends a verify message to DataVerifier 208, which initiates a verification procedure (i.e., determines whether or not a database change in database 110 (see FIG. 1) is verified). In step 220, the verify message includes the test query and expected test result data that were sent in step 218.

In one embodiment, the verify message passes the data input objects to a particular verifier class based on the type of database change identified in step 216. DataChangeVerificationProcess 202 may receive the aforementioned hash map of all input data. From the hash map, a method in DataChangeVerificationProcess 202 filters a particular type of database change and passes the database changes of that type to a corresponding verifier class (e.g., a class that verifies master data changes in the target database, a class that verifies meta data changes in the target database, or a class that verifies database trigger changes in the target database). Each of the types of verifier classes implements a verify method from a base class (see DataVerifier class 510 in FIG. 5A) to perform the desired database change verification per the type of verifier. The verify method is overridden by all the verifier classes for each type of database change.

Depending on the type of database change identified in step 216, a DataVerifierFactory class (not shown) returns an instance of a particular DataVerifier class. Different DataVerifier classes are described below relative to FIG. 5A. In one embodiment, all of the different DataVerifier classes are singleton classes.

In one embodiment, in step 220, the verify message specifies that the verification of the database change occurs on the environment identified by the target environment argument described above.

In step 222, DataVerifier 208 sends a response message to DataChangeVerificationProcess 202, where the response message includes an indication that the database change is verified (e.g., a result of a test query is a success) or an indication that the database change includes a defect (e.g., a result of test query is a failure). The actions performed in steps 220 and 222 are described in more detail in the discussion presented below relative to FIG. 3.

In step 224, DataChangeVerificationProcess 202 sends a closeConnection message to DCRConnectionManager 204 to initiate a closing of the connection created in step 212. In step 226, DCRConnectionManager 204 sends a response to DataChangeVerificationProcess 202, which results in a completion of the closing of the connection created in step 212.

In step 228, DataChangeVerificationProcess 202 sends a generateOutput message to OutputLogGenerator 210. OutputLogGenerator 210 generates results file 112 (see FIG. 1). In step 230, OutputLogGenerator 210 sends a response to DataChangeVerificationProcess 202, where the response includes results file 112 (see FIG. 1). Results file 112 (see FIG. 1) includes an indication that the database change is valid (i.e., results of the one or more test queries successfully matched the corresponding expected test result data) or an indication that the database change is invalid (i.e., at least one test query result failed to match the corresponding expected test result data) and that a defect in an application coupled to database 110 (see FIG. 1) exists. DCV computer system 102 (see FIG. 1) stores results file 112 (see FIG. 1) in a computer data storage unit (not shown in FIG. 1). Following step 230, if the database change is invalid, results file 112 (see FIG. 1) is displayed to a user (e.g., on a display device), and the user corrects the defect in the application by modifying the database change (e.g., modifying the SQL command in a query that provided the database change, modifying parameters of the SQL command in the query that provided the database change, modifying a trigger of the target database, and/or modifying attributes of the target database).

It should be noted that the names of components 202, 204, 206, 208 and 210 and the names of commands described in this section are merely examples-the present invention contemplates embodiments in which different names are used.

Figure 3:
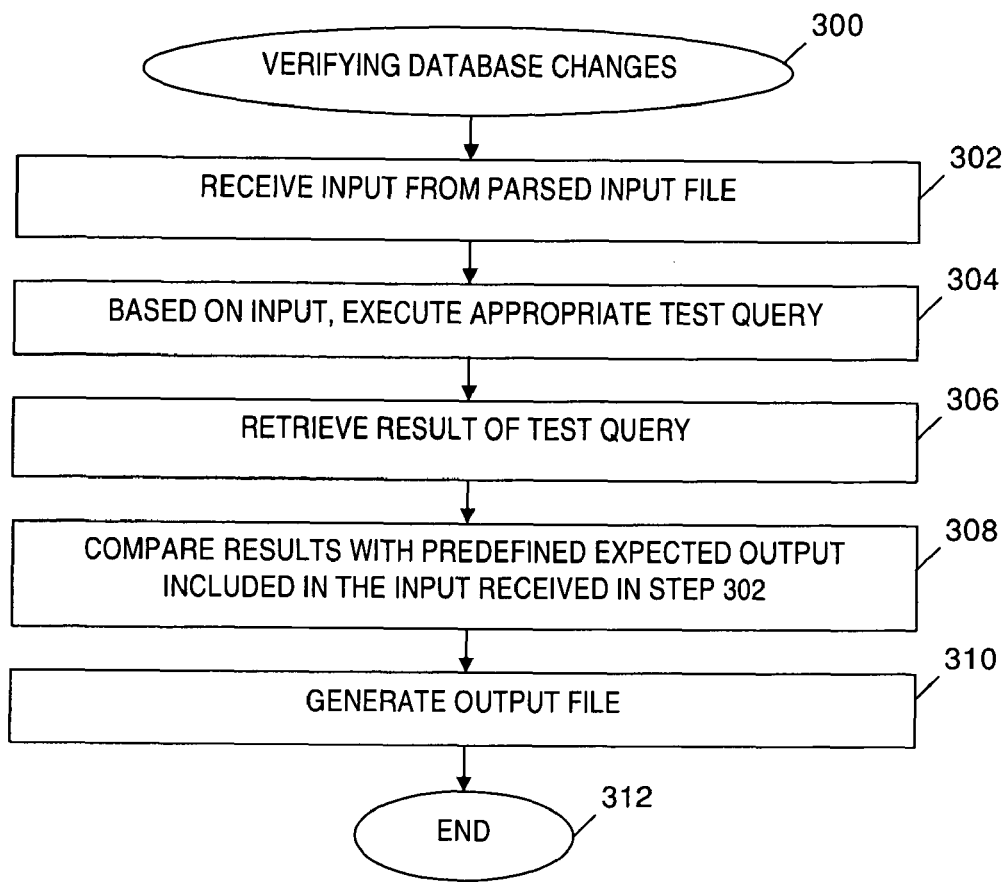
FIG. 3 is a flowchart of the database change verification process included in the sequence diagram of FIG. 2, in accordance with embodiments of the present invention.

FIG. 3 is a flowchart of the database change verification process included in the sequence diagram of FIG. 2, in accordance with embodiments of the present invention. The database change verification process begins at step 300. In step 302, DataVerifier 208 (see FIG. 2) receives database change input that specifies a database change and expected test result data. The database change input received in step 302 is received from a parsed input file, where DCV program 104 (see FIG. 1) retrieves the input file from inputs configuration 106 (see FIG. 1) prior to step 302.

In step 304 and based on the input received in step 302, DataVerifier 208 (see FIG. 2) identifies and selects an appropriate test query based on the database change specified by the input received in step 302 and then queries database 110 (see FIG. 1) with the appropriate test query (i.e., executes the selected test query on the target database). If the database change is a change to meta data, then the appropriate test query selected in step 304 obtains meta data of database 110 (see FIG. 1).

In one embodiment, a test query is selected as the appropriate test query in step 304 based on the particular environment of the application (e.g., local, development, integration, testing, staging (pre-production), production, etc.). That is, different test queries may be executed at different environments.

In step 306, DataVerifier 208 (see FIG. 2) retrieves a result. The result retrieved in step 306 is a result of querying database 110 (see FIG. 1) with the test query in step 304. If the database change is a change to meta data, then the result retrieved in step 306 is meta data of database 110 (see FIG. 1) resulting from the execution of the test query in step 304.

In step 308, DataVerifier 208 (see FIG. 2) compares the result of step 306 with expected test result data that is specified by the input received in step 302. If the comparison in step 308 detects a match between the result of step 306 and the expected test result data, then DataVerifier 208 (see FIG. 2) determines that the database change is verified. If the comparison in step 308 detects a mismatch between the result of step 306 and the expected test result data, then DataVerifier 208 (see FIG. 2) determines that the database change is not verified and that the database change includes a defect.

In step 310, DataVerifier 208 (see FIG. 2) sends the determination resulting from the comparison in step 308 to DataChangeVerificationProcess 202 (see FIG. 2). In response, DataChangeVerificationProcess 202 (see FIG. 2) initiates a generation of results file 112 (see FIG. 1) by OutputLogGenerator 210 (see FIG. 2), which includes the determination resulting from the comparison in step 308. The database change verification process ends at step 300.

Class Diagrams

Figure 4A:
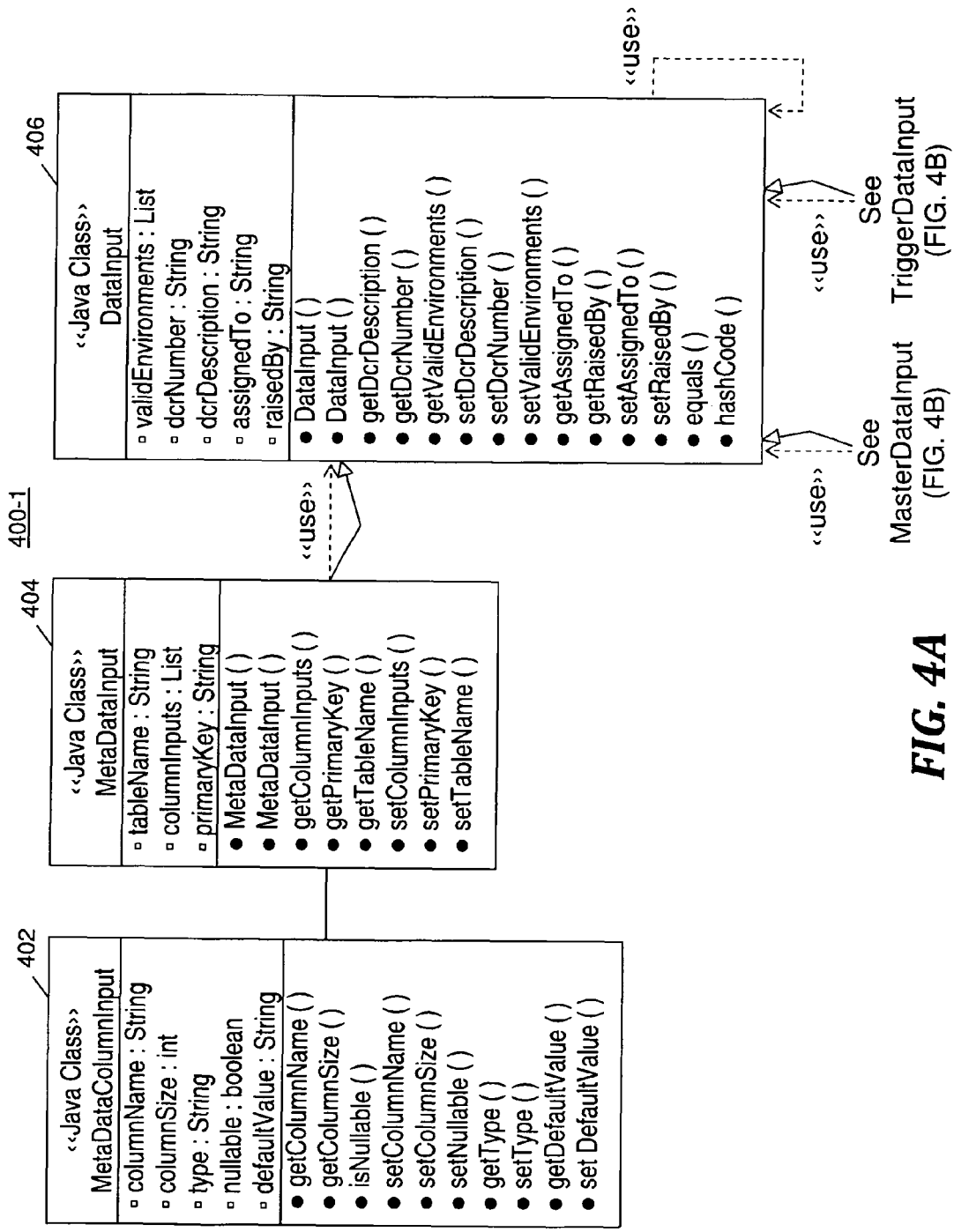
FIGS. 4A-4B depict a first class diagram of classes of input data parsed from an input file in the sequence diagram of FIG. 2 and received in the process of FIG. 3, in accordance with embodiments of the present invention.
Figure 4B:
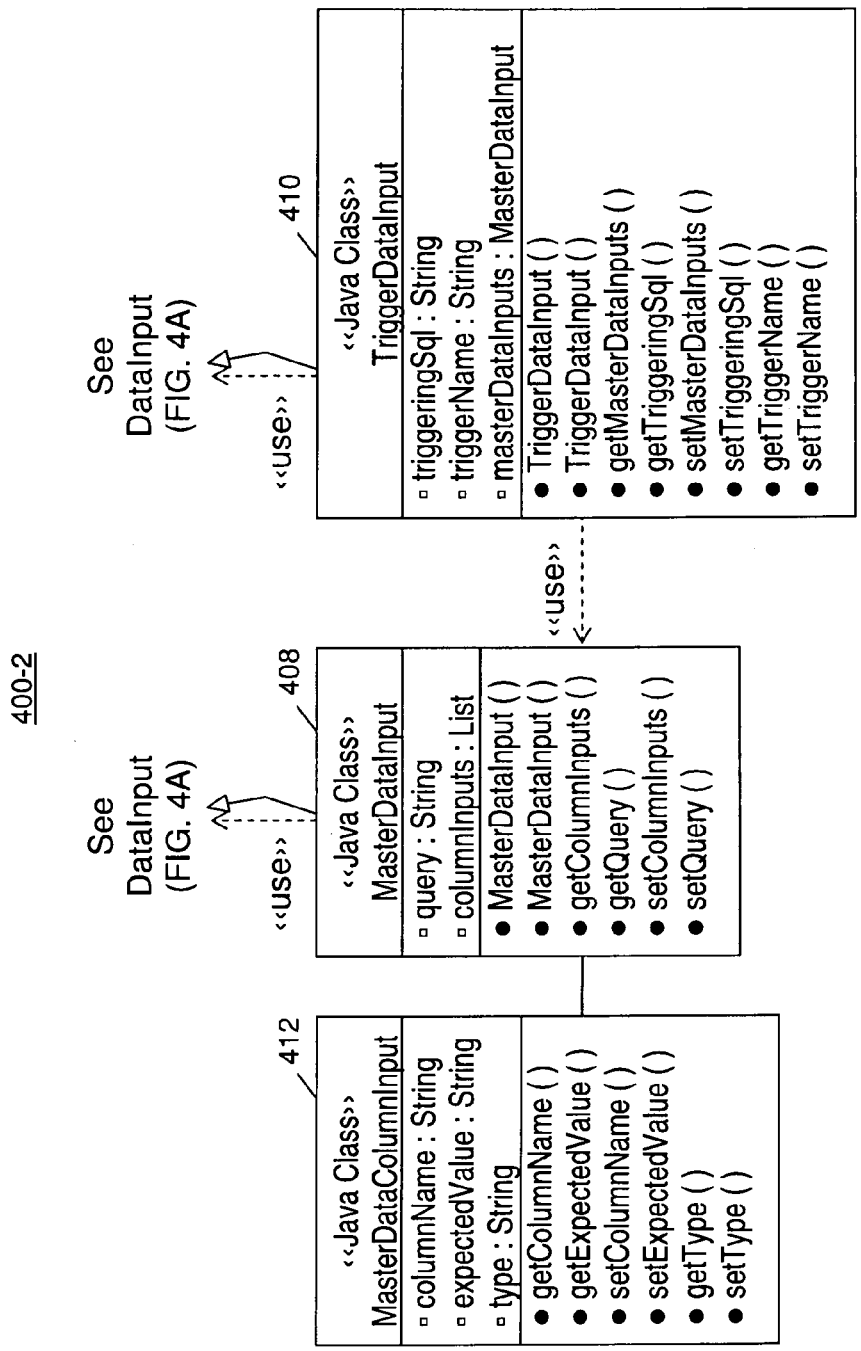

FIGS. 4A-4B depict a first class diagram of exemplary classes of input data parsed from an input file in the sequence diagram of FIG. 2 (see steps 216 & 218) and received in the process of FIG. 3 (see step 302), in accordance with embodiments of the present invention. The first class diagram has a first portion 400-1 (see FIG. 4A) and a second portion 400-2 (see FIG. 4B). First portion 400-1 includes the Java® classes MetaDataColumnInput 402, MetaDataInput 404 and DataInput 406. Second portion 400-2 (see FIG. 4B) includes the Java® classes MasterDataInput 408, TriggerDataInput 410, and MasterDataColumnInput 412. The aforementioned classes in the class diagram of FIGS. 4A-4B are created and populated by InputXmlProcessor 206 (see FIG. 2) by parsing the input file in step 216 (see FIG. 2).

Figure 6:
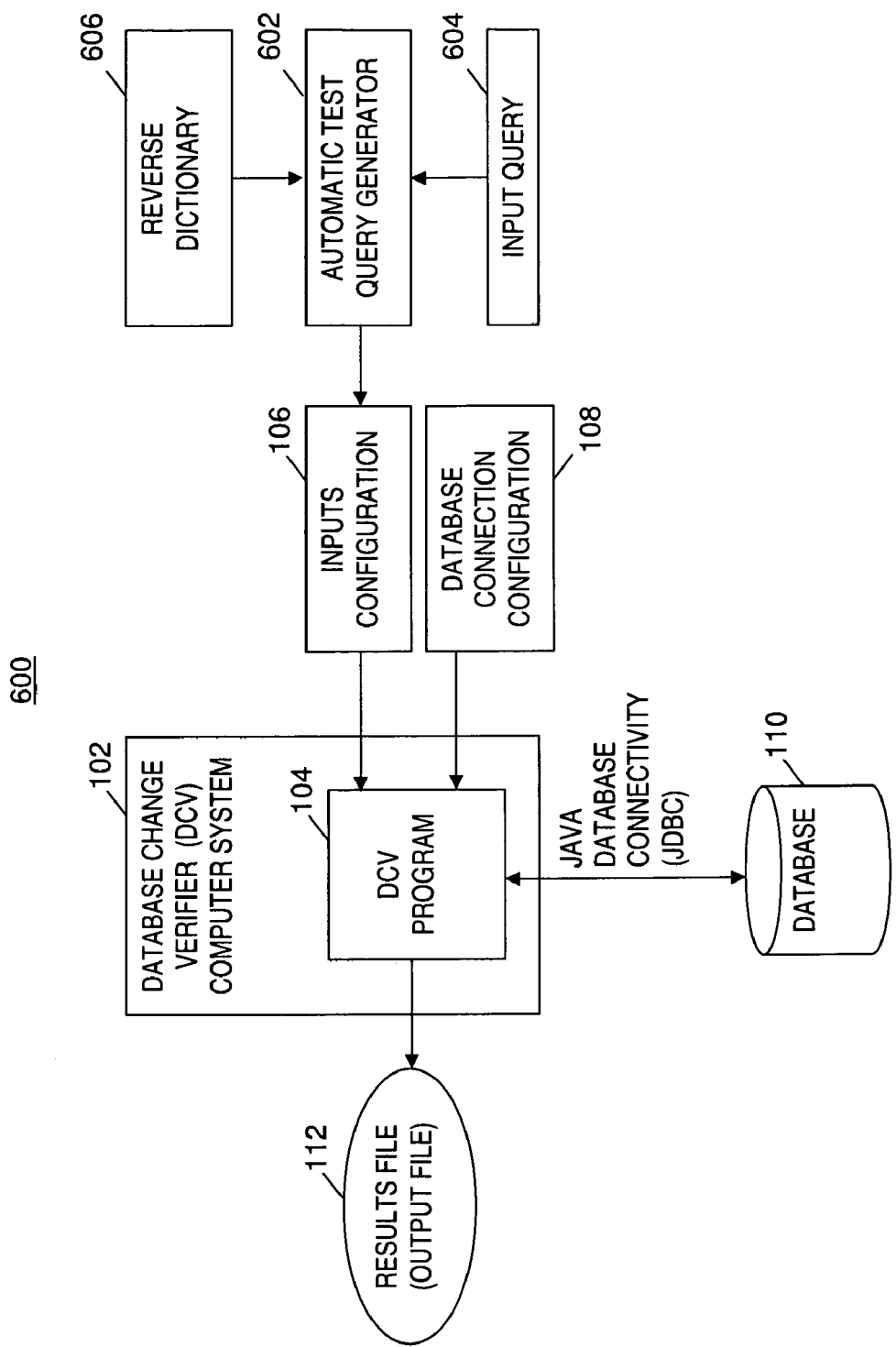
FIG. 6 is a block diagram of a system for automatically verifying database changes by using automatically generated test queries, in accordance with embodiments of the present invention.

DataInput 406 (see FIG. 4A) is a super class for all the types of input extracted from an input file in inputs configuration 106 (see FIG. 1 and FIG. 6). In one embodiment, the types of input are (1) input for verifying a change in meta data of a database, (2) input for verifying a change in master data (i.e., non-meta data) of a database, and (3) input for verifying a change in a database trigger, which are specified by MetaDataInput 404 (see FIG. 4A), MasterDataInput 408 (see FIG. 4B), and TriggerDataInput 410 (see FIG. 4B), respectively.

In one embodiment, DataInput 406 (see FIG. 4A) specifies ValidEnvironments, a list of valid environments against which the automatic database change verification process runs. That is, the list of valid environments specifies a complete set of environments in which the database change verification process should be verifying the database changes. The valid environments in the list are specific to the application or project. The list of valid environments may be configured in a resource bundle file (i.e., database connection configuration 108 (see FIG. 1). For example, the list of valid environments may be LOCAL, DEV, TEST, and PROD, which indicate the local, development, test and production environments, respectively.

DataInput 406 (see FIG. 4A) may also specify dcrNumber (i.e., the DCR number by which the DCR was raised), dcrDescription (i.e., a description of the DCR that is provided by the person who has raised the DCR), assignedTo (i.e., name of the DBA who has worked on the DCR), and raisedBy (i.e., name of the person who has raised the DCR).

MasterDataColumnInput 412 (see FIG. 4B) is the class for master data column input and is associated with the MasterDataInput class 408 (see FIG. 4B). In one embodiment, MasterDataColumnInput 412 may specify columnName (i.e., a name of a column to be verified), expectedValue (i.e., the expected value of the column named by columnName), and type (i.e., the data type of the column named by columnName; e.g., String, Integer, Double, or timestamp).

MasterDataInput 408 (see FIG. 4B) is a class for master data input. Master data for an application is data that is required for the application to run. Master data is the data that is not added or deleted by the application. For example, in an order processing application in a system, master data may be types of reports generated by the system. In one embodiment, master data input is used by a verifier process (see, e.g., MasterDataVerifier in FIG. 5A) to verify that the DCR is applied correctly.

In one embodiment, MasterDataInput 408 (see FIG. 4B) may specify query (i.e., a query that needs to be fired on the database) and columnInputs (i.e., a list of column inputs that have the expected value for each column after the query is fired).

MetaDataColumnInput 402 (see FIG. 4A) is a class for meta data column input and is associated with MetaDataInput class 404 (see FIG. 4A). MetaDataColumnInput 402 (see FIG. 4A) provides the input for each column that needs to be verified as part of meta data verification.

In one embodiment, MetaDataColumnInput 402 (see FIG. 4A) may specify columnName (i.e., name of a column whose value needs to be verified), columnSize (i.e., size of the column that needs to be verified), type (i.e., data type of the column), nullable (i.e., a Boolean value indicating whether or not the nullability of the column needs to checked, and defaultValue (i.e., the expected default value for the column).

MetaDataInput 404 (see FIG. 4A) is a class for meta data input, which applies to all meta data DCRs. A meta data verifier (i.e., MetaDataVerifier 504 in FIG. 5A) uses meta data input to verify that the DCR is applied correctly. Data such as column nullability, size, default value, and primary key can be checked with the help of meta data input.

In one embodiment, MetaDataInput 404 (see FIG. 4A) may specify tableName (i.e., the name of the table for which the meta data needs to be verified), columnInputs (i.e., a list of column inputs that needs to be verified for the table, and primaryKey (i.e., a list of primary keys that needs to be verified on the table).

TriggerDataInput 410 (see FIG. 4B) is a class for trigger data input. Trigger data input applies to all the trigger data DCRs. Trigger data input is used by a verifier (see, e.g., TriggerDataVerifier in FIG. 5A) to verify that the DCR is applied correctly. Scenarios such as fire a trigger on one table and verify the results on another or the same table can be done using trigger data input.

In one embodiment, TriggerDataInput 410 (see FIG. 4B) specifies triggeringSql (i.e., a triggering SQL command that is fired on database 110 of FIG. 1 and that invokes the trigger), triggerName (i.e., a name of the trigger), and masterDataInputs (i.e., master data that needs to be verified after the triggering SQL has been fired).

Figure 5A:
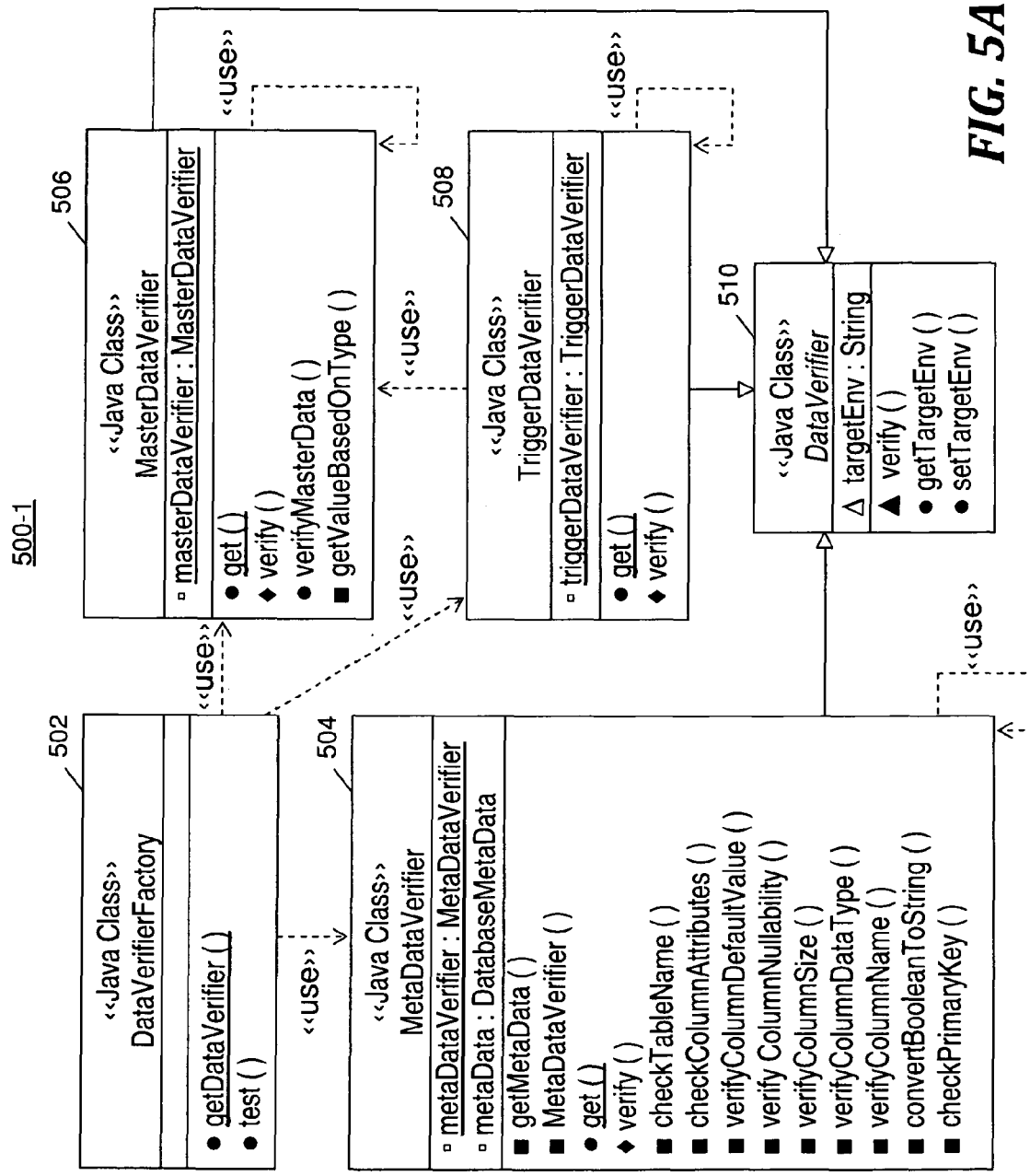
FIGS. 5A-5B depict a second class diagram of classes of objects included in the sequence diagram of FIG. 2, in accordance with embodiments of the present invention.
Figure 5B:
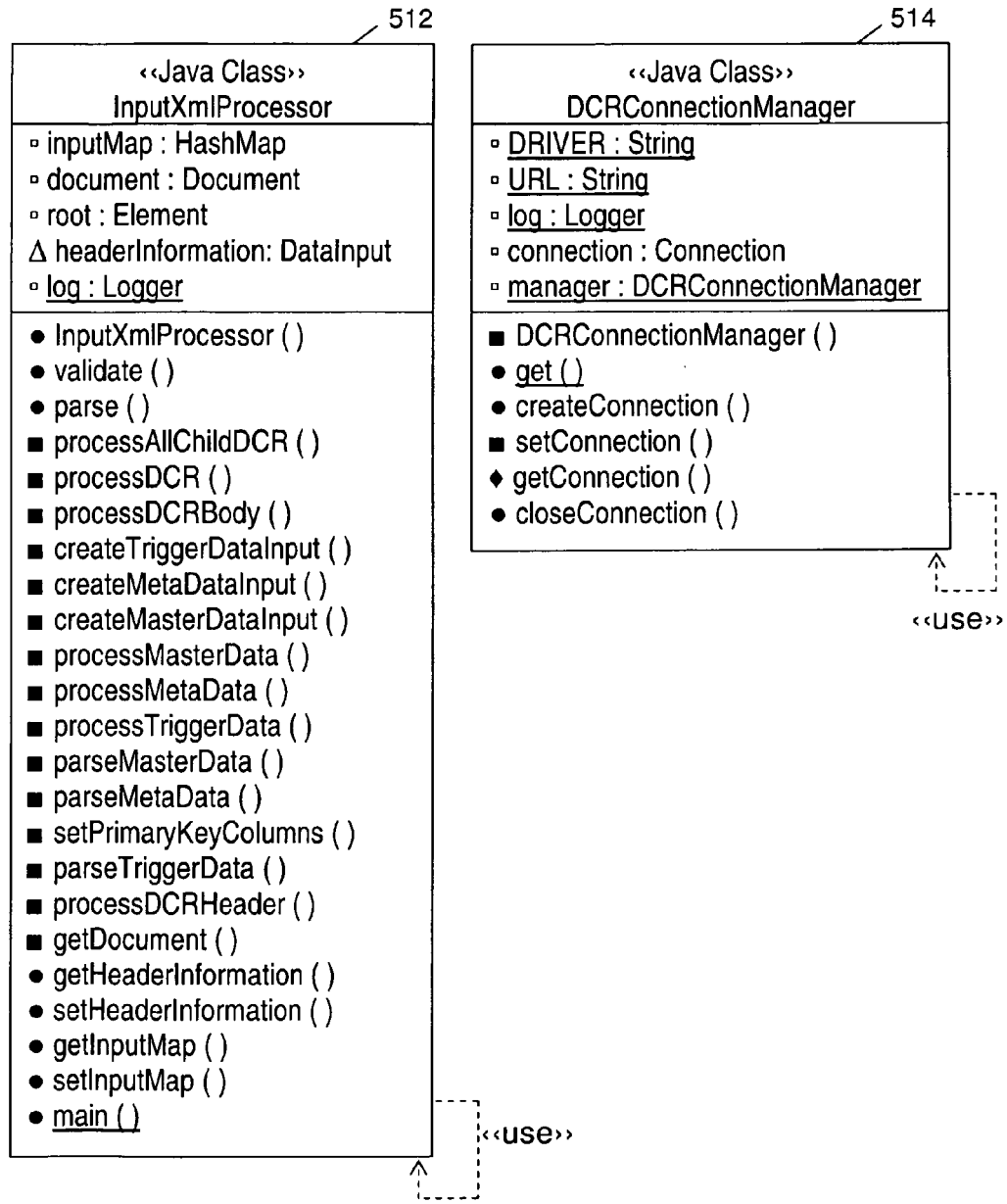

FIGS. 5A-5B depict a second class diagram of exemplary classes of objects included in the sequence diagram of FIG. 2, in accordance with embodiments of the present invention. The second class diagram has a first portion 500-1 (see FIG. 5A) and a second portion 500-2 (see FIG. 5B). First portion 500-1 includes Java® classes DataVerifierFactory 502, MetaDataVerifier 504, MasterDataVerifier 506, TriggerDataVerifier 508, and DataVerifier 510 (collectively referred to herein as the verifier classes). Second portion 500-2 includes Java® classes InputXmlProcessor 512 and DCRConnectionManager 514.

The class diagram of FIGS. 5A-5B includes the classes for the XML processor (i.e., InputXmlProcessor 206 in FIG. 2), the connection manager (i.e., DCRConnectionManager 204 in FIG. 2) and the verifier (i.e., DataVerifier 208 in FIG. 2).

DataVerifier 510 (see FIG. 5A) is a base class for all the types of data verifier classes: MasterDataVerifier 506 (see FIG. 5A), MetaDataVerifier 504 (see FIG. 5A), and TriggerDataVerifier 508 (see FIG. 5A).

MasterDataVerifier 506 (see FIG. 5A) is a class that verifies changes to master data in database 110 (see FIG. 1). Examples of changes to master data include adding a new row to a table and updating an existing row in a table. A singleton instance of MasterDataVerifier 506 is specified in step 220 (see FIG. 2) and includes a method that returns an instance of the MasterDataVerifier class 506. MasterDataVerifier 506 also includes a verify method that verifies database changes to master data. The verify method accepts a list of MasterDataInput objects (see MasterDataInput 408 in FIG. 4B), iterates over the list, and verifies each input object by calling a verifyMasterData( ) method. The verifyMasterData( ) method accepts and verifies a MasterDataInput object against the target database based on a comparison of each actual value in the result set with a corresponding expected value, where the expected values are extracted from the input file (see step 216 of FIG. 2). If there is a mismatch between an actual value and the expected value, the verifyMasterData( ) method outputs a message to results file 112 (see FIG. 1), where the message indicates a failure (i.e., an invalid actual value). If the actual value does match the expected value, then the method determines that the value is valid.

Furthermore, MasterDataVerifier 506 includes getValueBasedOnType method that accepts parameters of a result set object and a MasterDataColumnInput object (see class 412 in FIG. 4B), and returns an actual value included in the result set object depending on the data type (e.g., double, string, etc.). As used herein, a result set object includes actual data values resulting from an execution of a test query on the target database and/or actual attributes of the target database.

MetaDataVerifier 504 (see FIG. 5A) is a class that verifies changes to meta data in database 110 (see FIG. 1). Examples of changes to meta data include creating a new table, adding a new column to an existing table, and changing a primary key. A singleton instance of MetaDataVerifier 504 is specified in step 220 (see FIG. 2) and includes a method that returns an instance of the MetaDataVerifier class 504. MetaDataVerifier 504 includes a method that retrieves meta data for the target database from the connection object. MetaDataVerifier 504 also includes a verify method that verifies database changes to meta data. The verify method accepts a list of MetaDataInput objects (see MetaDataInput 404 in FIG. 4A), iterates over the list, and verifies each input object by calling other verification methods. The other verification methods include (1) a checkTableName method that checks if a table name is correct in the target database (e.g., to verify a new table that has been created), (2) a checkColumnAttributes method that checks different column attributes of a table, and (3) a checkPrimaryKey method that checks if a primary key of a table matches with the expected primary key as given in the input file.

In one embodiment, the checkTableName method receives a MetaDataInput 404 (see FIG. 4A) object as a parameter and determines that a table name is correct if the table name is found in the target database and is not null.

In one embodiment, the checkColumnAttributes method calls one or more of the following methods: (1) a verifyColumnName method that verifies the name of a particular column in a table in the target database, (2) a verifyColumnDataType method that verifies the data type for a particular column in a table in the target database, (3) a verifyColumnSize method that verifies the column size of a table in the target database, (4) a verifyColumnNullability method that verifies whether or not a column in a table of the target database is nullable, and (5) a verifyColumnDefaultValue method that verifies a default value in a column in the target database.

The verifyColumnName method receives a result set parameter that includes an actual name of the column being verified and a MetaDataColumnInput 402 (see FIG. 4A) object parameter that includes the expected name of the column. The expected name is extracted from the input file (see step 216 of FIG. 2). The verifyColumnName method compares the actual name of the column to the expected name and outputs a message to results file 112 (see FIG. 1), where the message indicates a failure (i.e., an invalid column name) if the actual name does not match the expected name. If the actual name does match the expected name, then the method determines that the column name is valid.

The verifyColumnDataType method receives a result set parameter that includes an actual data type of a column of the target database and a MetaDataColumnInput 402 (see FIG. 4A) object parameter that includes the expected data type of the column. The expected data type is extracted from the input file (see step 216 of FIG. 2). The verifyColumnDataType method compares the actual data type to the expected data type and outputs a message to results file 112 (see FIG. 1), where the message indicates a failure (i.e., an invalid data type) if the actual data type does not match the expected data type. If the actual data type does match the expected data type, then the method determines that the data type is valid.

The verifyColumnSize method receives a result set parameter that includes an actual size (a.k.a. column size) of a column of the target database and a MetaDataColumnInput 402 (see FIG. 4A) object parameter that includes the expected size of the column. The expected size is extracted from the input file (see step 216 of FIG. 2). The verifyColumnSize method compares the actual size to the expected size and outputs a message to results file 112 (see FIG. 1), where the message indicates a failure (i.e., an invalid column size) if the actual size does not match the expected size. If the actual size does match the expected size, then the column size is valid.

The verifyColumnNullability method receives a result set parameter that includes an actual indicator (a.k.a. column nullability indicator) of whether or not a column of the target database is nullable and a MetaDataColumnInput 402 (see FIG. 4A) object parameter that includes the expected indicator of whether or not the column is nullable. The expected indicator of column nullability is extracted from the input file (see step 216 of FIG. 2). The verifyColumnNullability method compares the actual column nullability indicator to the expected column nullability indicator and outputs a message to results file 112 (see FIG. 1), where the message indicates a failure (i.e., an invalid column nullability indicator) if the actual column nullability indicator does not match the expected column nullability indicator. If the actual column nullability indicator does match the expected column nullability indicator, then the method determines that the column nullability indicator is valid.

The verifyColumnDefaultValue method receives a result set parameter that includes an actual default value for a column of the target database and a MetaDataColumnInput 402 (see FIG. 4A) object parameter that includes the expected default value of the column. The expected default value is extracted from the input file (see step 216 of FIG. 2). The verifyColumnDefaultValue method compares the actual default value to the expected default value and outputs a message to results file 112 (see FIG. 1), where the message indicates a failure (i.e., an invalid default value) if the actual default value does not match the expected default value. If the actual default value does match the expected default value, then the method determines that the default value for the column is valid.

In one embodiment, the checkPrimaryKey method receives a MetaDataInput 404 (see FIG. 4A) object as a parameter. The expected primary key is extracted from the input file (see step 216 of FIG. 2). The checkPrimaryKey method compares the actual primary key to the expected primary key and determines whether or not the actual primary key matches the expected primary key. The checkPrimaryKey method outputs a message to results file 112 (see FIG. 1), where the message indicates a failure (i.e., an invalid primary key) if the actual primary key does not match the expected primary key. If the actual primary key does match the expected primary key, then the method determines that the primary key is valid.

TriggerDataVerifier 508 (see FIG. 5A) is a class that verifies changes to database triggers in database 110 (see FIG. 1). Examples of changes to triggers include creating a new update trigger, a new insert trigger, or a new delete trigger for a particular table. Other examples of changes to triggers include updating an update trigger, an insert trigger, or a delete trigger for a particular table. A singleton instance of TriggerDataVerifier 508 is specified in step 220 (see FIG. 2). TriggerDataVerifier 508 includes a verify method that verifies database changes to triggers. The verify method accepts a list of TriggerDataInput objects (see TriggerDataInput 410 in FIG. 4B), iterates over the list, and verifies each input object by calling other verification methods. The verify method of TriggerDataVerifier 508 performs the following steps to functionally execute a trigger: (1) sets the auto-commit property of the connection to false; (2) inserts, deletes, or updates row(s) in the target table, which causes the trigger to execute; (3) verifies, via the test query, that the data has been inserted, deleted or updated from the triggered table; and (4) rolls back the changes completed in step (2) so that the functional execution of the trigger results in no change to the state of the database from the user's perspective.

The other verification methods include (1) a checkTableName method that checks if a table name is correct in the target database (e.g., to verify a new table that has been created), (2) a checkColumnAttributes method that checks different column attributes of a table, and (3) a checkPrimaryKey method that checks if a primary key of a table matches with the expected primary key as given in the input file.

The DCRConnectionManager class 514 (see FIG. 5B) creates a connection to database 110 (see FIG. 1), as described above relative to steps 212 and 214 of FIG. 2.

The InputXmlProcessor class 512 (see FIG. 5B) parses the input file (e.g., input.xml), retrieves a test query and expected test result data from the parsed input file, and populates the input classes depicted in FIGS. 4A-4B with the retrieved test query and expected test result data (see steps 216 & 218 of FIG. 2).

The verifier classes include the core code to execute the test queries (see step 304 of FIG. 3) and compare the expected test result data with the actual data in database 110 (see FIG. 1), as described above relative to step 308 (see FIG. 3).

Automatically Generated Test Queries

FIG. 6 is a block diagram of a system for automatically verifying database changes by using automatically generated test queries, in accordance with embodiments of the present invention. System 600 includes DCV computer system 102, DCV program 104, inputs configuration 106, database connection configuration 108, database 110, and results file 112, which have functionalities as described above relative to FIG. 1. In system 600, inputs configuration 106 has the additional functionality of receiving test queries from an automatic test query generator 602. Automatic test query generator 602 receives an input query 604 and automatically generates a test query based on the input query. Executing the input query 604 makes a database change in target database 110. Automatic test query generator 602 automatically generates the test query by looking up an entry in a reverse dictionary 606, where the entry associates the input query 604 with a reverse command (i.e., a command that provides a reverse of an operation or action of an original command in the input query 604). Reverse dictionary 606 includes an entry that associates an SQL create command with the SQL describe command (i.e., the describe command is the reverse of the create command). Furthermore, reverse dictionary 606 includes entries that associate the SQL commands of insert, delete and update with the SQL select command (i.e., the select command is the reverse of each of the insert, delete and update commands). Reverse dictionary 606 and input query 604 are stored in a memory (not shown in FIG. 6) coupled to DCV computer system 102 or in one or more computer data storage units (not shown in FIG. 6) coupled to DCV computer system 102. In one embodiment, inputs configuration 106 in system 600 may receive only automatically generated test queries from automatic test query generator 602. In another embodiment, inputs configuration 106 in system 600 may receive a first set of one or more test queries that are manually generated and a second set of one or more test queries that are generated automatically by automatic test query generator 602.

Figure 7:
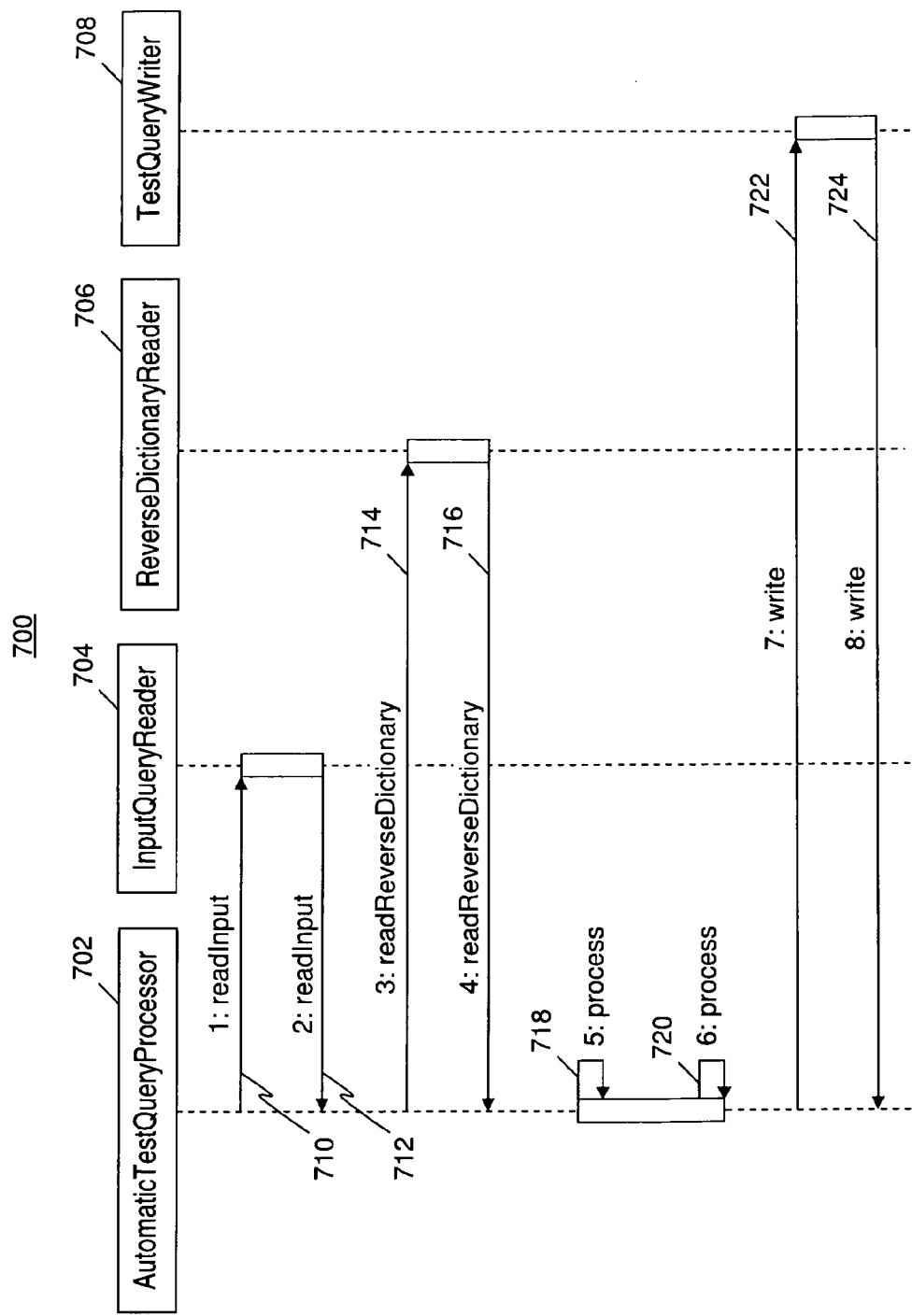
FIG. 7 is a sequence diagram of processes that include an automatic database change verification process that uses automatically generated test queries, where the process is implemented by the system of FIG. 6, in accordance with embodiments of the present invention.

The functionalities of automatic test query generator 602, input query 604 and reverse dictionary 606 are described in more detail in the discussion of FIG. 7 presented below.

FIG. 7 is a sequence diagram of processes that include an automatic database change verification process that uses automatically generated test queries, where the process is implemented by the system of FIG. 6, in accordance with embodiments of the present invention. Sequence diagram 700 includes the following objects of automatic test query generator 602 (see FIG. 6): an AutomaticTestQueryProcessor 702, an InputQueryReader 704, a ReverseDictionaryReader 706, and a TestQueryWriter 708.

In step 710, AutomaticTestQueryProcessor 702 sends a readInput message to InputQueryReader 704 to read input query 604 (see FIG. 6). In step 712, InputQueryReader 704 sends a response message that includes input query 604 (see FIG. 6) to AutomaticTestQueryProcessor 702.

In step 714, AutomaticTestQueryProcessor 702 sends a readReverseDictionary message to ReverseDictionaryReader 706, where the readReverseDictionary message includes input query 604 (see FIG. 6). In step 714, ReverseDictionaryReader 706 parses input query 604 (see FIG. 6) and extracts an SQL command from the input query 604 (see FIG. 6). Also in step 714, ReverseDictionaryReader 706 looks up and retrieves an entry in reverse dictionary 606 (see FIG. 6) that associates the extracted SQL command with an SQL command (i.e., the reverse command) that is the reverse of the extracted SQL command. ReverseDictionaryReader 706 extracts the reverse command from the retrieved entry of reverse dictionary 606 (see FIG. 6).

In step 716, ReverseDictionaryReader 706 sends a response message to AutomaticTestQueryProcessor 702, where the response message includes the extracted reverse command.

In step 718, AutomaticTestQueryProcessor 702 parses input query 604 (see FIG. 6) to extract items included in the input query, where a first set of one or more items (e.g., column names and a table name) are to be included in the test query and a second set of one or more items are data items to be included in the expected output. Also in step 718, AutomaticTestQueryProcessor 702 automatically generates a test query by using the extracted reverse command and the extracted first set of one or more data items. In one embodiment, if the extracted reverse command is the SQL describe command, then step 718 includes generating an intermediate SQL query that includes the extracted describe command, converting the intermediate SQL query into meta data column tags, and then generating a test query in the input file that includes the meta data column tags rather than the describe command per se. If the extracted reverse command is the SQL command of insert, delete or update, then step 718 includes generating a test query that includes the extracted reverse command. Furthermore, in step 718, the test query and expected output are used to generate an output (step 720), which is as per format specified in the input file. In step 720, AutomaticTestQueryProcessor 702 completes the automatic generation of the test query.

In step 722, AutomaticTestQueryProcessor 702 sends a write message to TestQueryWriter 708 to provide inputs configuration 106 (see FIG. 6) with the automatically generated test query and expected output. In step 722, TestQueryWriter 708 writes the test query and expected output automatically generated in step 718 to inputs configuration 106 (see FIG. 6) (i.e., stores the automatically generated test query in an input file included in a computer data storage unit).

In step 724, TestQueryWriter sends a response message to AutomaticTestQueryProcessor 702 to indicate that the automatically generated test query has been written to inputs configuration 106 (see FIG. 6). In one embodiment, the steps of FIG. 2 follow step 724, where the test query retrieved in step 216 of FIG. 2 is the test query automatically generated in step 718.

For example, input query 604 (see FIG. 6) is "Insert table col1, col2 (data to be inserted)" (i.e., the original command). The original command is read (see step 710). A lookup of reverse dictionary 606 (see FIG. 6) is performed to retrieve the Select command (i.e., the reverse command of the Insert command) (see step 714). Data items col1, col2, and the table name are extracted from the original command (see step 718). A test query of "select col1, col2 from table name" is automatically generated (see step 718). The expected output is "data to be inserted", which was extracted from the original command (see step 714).

An embodiment that utilizes the system of FIG. 6 and the steps of FIG. 7 is limited to processing an input query that does not change throughout the environments in the development of an application (e.g., local, development, integration, testing, staging (pre-production), production, etc.).

An embodiment that requires a check as to whether a particular data item exists in a table cannot utilize the automatic generation of a test query described above relative to FIGS. 6 and 7; instead, a user manually specifies the test query and the expected output in an input file in inputs configuration 106 (see FIG. 1).

It should be noted that the names of components 702, 704, 706 and 708 and the names of commands described in this section are merely examples-the present invention contemplates embodiments in which different names are used.

Input File

This section provides three parts of an XML document that is an example of an input file included in inputs configuration 106 (see FIG. 1 and FIG. 6). The first part includes examples of data items in a <tablecommand> tag used to verify a change to meta data of the target database. The second part includes examples of data items in a <sqlCommand> tag used to verify a change to master data of the target database. The third part includes examples of data items in a <triggercommand> tag used to perform a functional verification of a trigger of the target database by invoking the trigger with the name of the trigger to execute a database transaction, verifying the change to the database caused by the trigger, and rolling back the database transaction, thereby returning the database to the database state that existed prior to the trigger being invoked (i.e., the functional verification of the trigger causes no change in the state of the database from the user's perspective).

First part of the XML document:

```
<tableCommand>
   <validEnv>
      <env>LOCAL</env>
      <env>DEV</env>
      <env>TEST</env>
      <env>PROD</env>
   </validEnv>
   <table>EMPLOYEE</table>
   <metaDataColumn name="EMPLOYEE_ID" type="VARCHAR"
      nullable="NO" />
   <metaDataColumn name="EMPLOYEE_NAME" type="VARCHAR"
      nullable="NO" />
   <metaDataColumn name="DESIGNATION" type="VARCHAR"
      nullable="NO" />
   <metaDataColumn name="DEPARTMENT" type="VARCHAR"
      nullable="NO" />
   <metaDataColumn name="ACTIVE_FLG" type="CHAR"
      nullable="NO" defaultValue="'T'" />
</tableCommand>
```

Second part of the XML document:

```
<sqlCommand>
   <validEnv>
      <env>LOCAL</env>
      <env>DEV</env>
      <env>TEST</env>
      <env>PROD</env>
   </validEnv>
```

```
<selectQuery>select EMPLOYEE_ID, EMPLOYEE_NAME,
    DESIGNATION, DEPARTMENT, ACTIVE_FLG from
    DB2ADMIN.EMPLOYEE where
    EMPLOYEE_ID='E001'</selectQuery>
<masterDataColumn name="EMPLOYEE_ID"
    expectedValue="E001" type="STRING" />
<masterDataColumn name="EMPLOYEE_NAME"
    expectedValue="RAMESH" type="STRING" />
<masterDataColumn name="DESIGNATION"
    expectedValue="SR.SOFTWARE" type="STRING" />
<masterDataColumn name="DEPARTMENT" expectedValue="E14"
    type="STRING" />
<masterDataColumn name="ACTIVE_FLG" expectedValue="T"
    type="STRING" />
</sqlCommand>
```

Third part of the XML document:

```
<triggerCommand>
    <validEnv>
        <env>LOCAL</env>
        <env>DEV</env>
        <env>TEST</env>
        <env>PROD</env>
    </validEnv>
    <triggeringSql>UPDATE DB2ADMIN.EMPLOYEE SET
        ACTIVE_FLG='F' WHERE
        EMPLOYEE_ID='E001'</triggeringSql>
    <triggerName>EMPLOYEE_AU</triggerName>
    <sqlCommand>
        <validEnv>
            <env>LOCAL</env>
            <env>DEV</env>
            <env>TEST</env>
            <env>PROD</env>
        </validEnv>
        <selectQuery>select EMPLOYEE_ID, EMPLOYEE_NAME,
            DESIGNATION, DEPARTMENT, ACTIVE_FLG from
            DB2ADMIN.OLD_EMPLOYEE where
            EMPLOYEE_ID='E001'</selectQuery>
        <masterDataColumn name="EMPLOYEE_ID"
            expectedValue="E001" type="STRING" />
        <masterDataColumn name="EMPLOYEE_NAME"
            expectedValue="RAMESH" type="STRING" />
        <masterDataColumn name="DESIGNATION"
            expectedValue="SR.SOFTWARE" type="STRING" />
        <masterDataColumn name="DEPARTMENT" expectedValue="E14"
            type="STRING" />
        <masterDataColumn name="ACTIVE_FLG" expectedValue="F"
            type="STRING" />
    </sqlCommand>
</triggerCommand>
```

To test the applicability of a Database Change Request (DCR) (i.e., verify the database change requested by the DCR), a developer prepares or modifies an XML document, such as the sample input file presented above in this section. The sample input file in this section includes database changes required to be verified against a particular environment.

Descriptions of the tags used in the sample input file presented above are included in Table 1 presented below.

TABLE 1

| TAG | DESCRIPTION |
| --- | --- |
| <sqlCommand> (in the second part of the XML document listed above) | This tag identifies the SQL command used to test the Master data DCRs |
| <validEnv> | This tag decides the valid environments in which the DCR can be verified. |
| <env> | This tag includes the name of the environment against which the database change should be verified. This environment identified by this tag is one of the environments defined in a property file in the database connection configuration 108 (see FIG. 1) (e.g., LOCAL to indicate the local environment). |
| <selectQuery> | The select query which is used to verify the DCR. |
| <masterDataColumn> | The expected values that need to be verified from the result set, once the above select query has been fired on the database. The valid attributes for this element are presented below:<br>name - Column name<br>expectedValue - The expected value of the column<br>type - The type of the column |
| <tableCommand> | This tag is used to test meta data DCRs. |
| <table> | The name of the table whose semantics needs to be verified. |
| <metaDataColumn> | The expected values which need to be verified on a particular column of the table identified by <table>. The valid attributes for this element are presented below:<br>name - Column Name<br>type - Data type of the column<br>size - Expected size of the column<br>nullable - Indicates whether or not the column is nullable<br>defaultValue - The default value for the column |
| <triggerCommand> | This tag provides inputs to verify triggers. |
| <triggeringSql> | The SQL command that fires a trigger. |
| <triggerName> | The name of the trigger |
| <sqlCommand> (in the third part of the XML document listed above; i.e., a child element of <triggerCommand>) | This tag identifies the SQL command used to verify the effect of firing the trigger identified by <triggerName>. The effect of firing the trigger may be verified on the same table or a different table. |

In one embodiment, it is assumed that in a services engagement, there are different environments and hence different databases. For example, there may be a test environment in which the application is tested by developers, a user testing environment in which the application is tested by users, and finally a production environment. There can be one or more other intermediate environments in which there may be a need to verify that the database changes have been correctly applied. To facilitate the verification of database changes over multiple environments, the configuration file which contains database connection configuration 108 (see FIG. 1 and FIG. 6) includes a parameter (a.k.a. target environment parameter; e.g., target-environment) that specifies a target environment against which the verification program runs. Moreover, some of the database changes may be applicable to one environment but not to another environment. For example, a database change may be applicable to the test environment and not to the production environment (e.g., test data on which developers want to test the application). To facilitate verification of database changes that are applicable to one environment but not another environment, the input file (e.g., input.xml) includes a tag (a.k.a. valid environment tag) that indicates valid environments (see, e.g., validenv in Table 1). This valid environment tag has one or more child tags (see, e.g., env tags in Table 1) which include one or more names of the one or more environments in which the database changes should be verified. The name(s) of the environment(s) and their database Uniform Resource Locator(s) (URL(s)) may be configured in the configuration file which contains database connection configuration 108 (see FIG. 1 and FIG. 6). For example, if a database change needs to be verified against the LOCAL environment and TEST environment, but not against the PROD (i.e., production) environment, then validEnv has env tags for LOCAL and TEST, but not for PROD. Furthermore, the database change verification tool disclosed herein allows the user the flexibility to execute a particular test query based on the particular target environment specified in the configuration file. For example, if test queries 1 through 10 are required for an application, the tool may extract and execute only test queries 1 through 8 if the configuration file specifies that the target environment is the TEST environment and the validEnv tag for test queries 1 through 8 is set to "TEST", and extract and execute test queries 1 through 10 if the target environment is the PROD (i.e., production) environment and the validEnv tag for test queries 1 through 10 is set to "PROD".

In one embodiment, the input file retrieved in step 216 (see FIG. 2) (1) associates a first set of one or more test queries and a first set of one or more expected outputs with a first valid environment (e.g., via a first valid environment tag) and (2) associates a second set of one or more test queries and a second set of one or more expected outputs with a second valid environment (e.g., via a second valid environment tag), where the first and second valid environments are mutually exclusive. The first set of one or more expected outputs is a set of one or more predefined outputs expected from executing the first set of one or more test queries. The second set of one or more expected outputs is a set of one or more predefined outputs expected from executing the second set of one or more test queries. The input file may specify different first and second sets of one or more test queries and different first and second sets of one or more expected outputs. Alternatively, the input file may specify first and second sets of one or more test queries that are the same while the first and second sets of one or more expected outputs are different. As another alternative, the input file may specify first and second sets of one or more test queries that are the same and first and second sets of one or more expected outputs that are the same. In the embodiment described in this paragraph, verifying a database change to an environment-specific database coupled to an application includes: (1) receiving a user-specified first target environment identifier from the configuration file which contains database connection configuration 108 (see FIG. 1 and FIG. 6), where the first target environment identifier identifies a first target environment of the application; (2) selecting and extracting a first set of one or more test queries and a first set of one or more expected outputs from the input file, where the input file associates a first valid environment identifier with the first set of one or more test queries and with the first set of one or more expected outputs, and where selecting and extracting the first set of one or more test queries and the first set of one or more expected outputs are based on the received first target environment identifier matching the first valid environment identifier; (3) automatically executing the first set of one or more test queries in a first environment identified by the first valid environment identifier to generate a first set of one or more actual outputs; (4) automatically verifying the database change based on a comparison of the first set of one or more actual outputs with the first set of one or more expected outputs (i.e., a match between the first set of one or more actual outputs and the first set of one or more expected outputs indicates a valid database change; a mismatch between the first set of one or more actual outputs and the first set of one or more expected outputs indicates an invalid database change); (5) subsequent to step (4), receiving a user-specified second target environment identifier from the configuration file which contains database connection configuration 108 (see FIG. 1 and FIG. 6), where the second target environment identifier identifies a second target environment of the application; (6) selecting and extracting a second set of one or more test queries and a second set of one or more expected outputs from the input file, where the input file associates a second valid environment identifier with the second set of one or more test queries and with the second set of one or more expected outputs, where selecting and extracting the second set of one or more test queries and the second set of one or more expected outputs are based on the received second target environment identifier matching the second valid environment identifier, where the first and second sets of one or more test queries may be the same or different, and where the first and second sets of one or more expected outputs are different; (7) automatically executing the second set of one or more test queries in a second environment identified by the second valid environment identifier to generate a second set of one or more actual outputs; and (8) automatically verifying the database change based on a comparison of the second set of one or more actual outputs with the second set of one or more expected outputs (i.e., a match between the second set of one or more actual outputs and the second set of one or more expected outputs indicates a valid database change; a mismatch between the second set of one or more actual outputs and the second set of one or more expected outputs indicates an invalid database change).

Prior to performing step (5) in the embodiment of the previous paragraph, the user-specified second target environment identifier replaces the user-specified first target environment identifier in the configuration file (i.e., configuration 108 in FIG. 1 and FIG. 6). In an alternate embodiment, the configuration file initially specifies both the first and second target environment identifiers. In this alternate embodiment, DCV program 104 (see FIG. 1 and FIG. 6) extracts the first target environment identifier from the configuration file that includes both the first target environment identifier and the second target environment identifier; performs the processing described above to automatically verify the database change using the first target environment identifier; automatically extracts the second target environment identifier from the configuration file; and performs the processing described above to automatically verify the database change using the second target environment identifier.

Computer System

Figure 8:
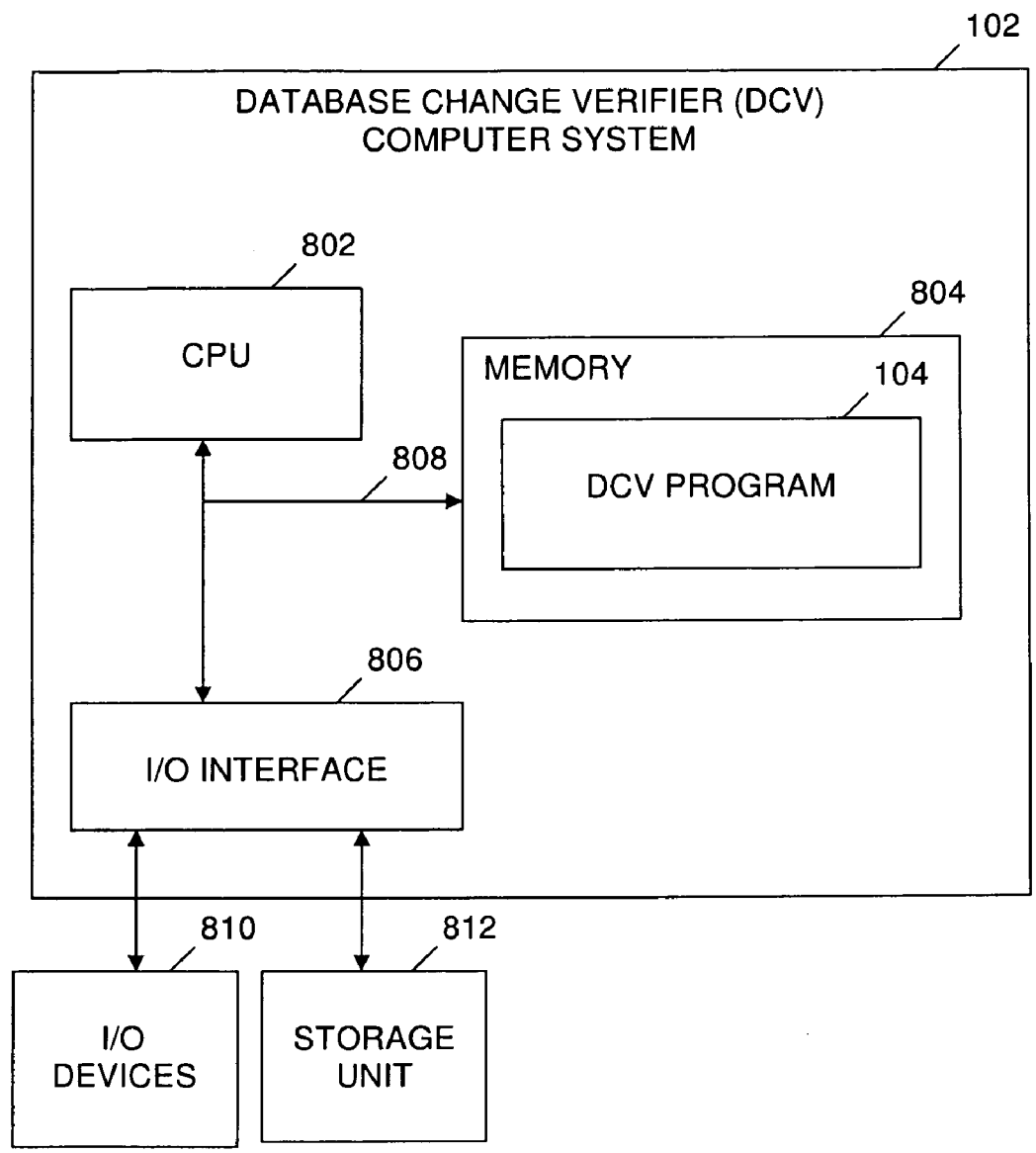
FIG. 8 is a block diagram of a computer system that is included in the system of FIG. 1 and the system of FIG. 6, in accordance with embodiments of the present invention.

FIG. 8 is a block diagram of a computer system that is included in the system of FIG. 1 and the system of FIG. 6, in accordance with embodiments of the present invention. Computer system 102 generally comprises a central processing unit (CPU) 802, a memory 804, an input/output (I/O) interface 806, and a bus 808. Further, computer system 102 is coupled to I/O devices 810 and a computer data storage unit 812. CPU 802 performs computation and control functions of computer system 102. CPU 802 may comprise a single processing unit, or be distributed across one or more processing units in one or more locations (e.g., on a client and server).

Memory 804 may comprise any known type of computer data storage and/or transmission media, including bulk storage, magnetic media, optical media, random access memory (RAM), read-only memory (ROM), a data cache, a data object, etc. In one embodiment, cache memory elements of memory 804 provide temporary storage of at least some program code (e.g., code 104) in order to reduce the number of times code must be retrieved from bulk storage during execution. Moreover, similar to CPU 802, memory 804 may reside at a single physical location, comprising one or more types of data storage, or be distributed across a plurality of physical systems in various forms. Further, memory 804 can include data distributed across, for example, a local area network (LAN) or a wide area network (WAN).

I/O interface 806 comprises any system for exchanging information to or from an external source. I/O devices 810 comprise any known type of external device, including a display device (e.g., monitor), keyboard, mouse, printer, speakers, handheld device, facsimile, etc. Bus 808 provides a communication link between each of the components in computer system 102, and may comprise any type of transmission link, including electrical, optical, wireless, etc.

I/O interface 806 also allows computer system 102 to store and retrieve information (e.g., data or program instructions such as code 104) from an auxiliary storage device such as computer data storage unit 812 or another computer data storage unit (not shown). Computer data storage unit 812 may be a non-volatile storage device, such as a magnetic disk drive (i.e., hard disk drive) or an optical disc drive (e.g., a CD-ROM drive which receives a CD-ROM disk).

Memory 804 includes computer program code 104 that provides the logic for verifying database changes (e.g., the process of FIG. 3). In one embodiment, code 104 provides logic for the processes of FIG. 2 and FIG. 3. In another embodiment, code 104 provides logic for the processes of FIG. 3 and FIG. 7. Further, memory 804 may include other systems not shown in FIG. 8, such as an operating system (e.g., Linux) that runs on CPU 802 and provides control of various components within and/or connected to computer system 102.

Memory 804, storage unit 812, and/or one or more other computer data storage units (not shown) that are coupled to computer system 102 may store DCV program 104 (see FIG. 1 and FIG. 6), inputs configuration 106 (see FIG. 1 and FIG. 6), database connection configuration 108 (see FIG. 1 and FIG. 6), database 110 (see FIG. 1 and FIG. 6), results file 112 (see FIG. 1 and FIG. 6), reverse dictionary 606 (see FIG. 6), automatic test query generator 602 (see FIG. 6), and input query 604 (see FIG. 6).

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 100 of FIG. 1, system 600 of FIG. 6, or computer system 102 of FIG. 1, FIG. 6, or FIG. 8). Furthermore, an embodiment of the present invention may take the form of a computer program product embodied in any tangible medium of expression (e.g., memory 804 or computer data storage unit 812) having computer-usable program code (e.g., code 104) embodied or stored in the medium.

Any combination of one or more computer-usable or computer-readable medium(s) (e.g., memory 804 and computer data storage unit 812) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 104 is printed, as the program 104 can be electronically captured via, for instance, optical scanning of the paper or other medium, then compiled, interpreted, or otherwise processed in a suitable manner, if necessary, and then stored in a computer memory 804. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code (e.g., program 104) embodied therewith, either in baseband or as part of a carrier wave. The computer-usable program code may be transmitted using any appropriate medium, including but not limited to wireless, wireline, optical fiber cable, RF, etc.

Computer program code (e.g., code 104) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computer system 102). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIG. 3), sequence diagrams (e.g., FIG. 2 and FIG. 7) and/or block diagrams of methods, apparatus (systems) (e.g., FIG. 1, FIG. 6 and FIG. 8), and computer program products according to embodiments of the invention. It will be understood that each block of the flowchart illustrations, sequence diagrams and/or block diagrams, and combinations of blocks in the flowchart illustrations, sequence diagrams and/or block diagrams, can be implemented by computer program instructions (e.g., code 104). These computer program instructions may be provided to a processor (e.g., CPU 802) of a general purpose computer, special purpose computer, or other programmable data processing apparatus to produce a machine, such that the instructions, which execute via the processor of the computer or other programmable data processing apparatus, create means for implementing the functions/acts specified in the flowchart sequence diagram and/or block diagram block or blocks.

These computer program instructions may also be stored in a computer-readable medium (e.g., memory 804 or computer data storage unit 812) that can direct a computer (e.g., computer system 102) or other programmable data processing apparatus to function in a particular manner, such that the instructions stored in the computer-readable medium produce an article of manufacture including instruction means which implement the function/act specified in the flowchart, sequence diagram and/or block diagram block or blocks.

The computer program instructions may also be loaded onto a computer (e.g., computer system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart, sequence diagram and/or block diagram block or blocks.

Any of the components of an embodiment of the present invention can be deployed, managed, serviced, etc. by a service provider that offers to deploy or integrate computing infrastructure with respect to the process for automatically verifying database changes. Thus, an embodiment of the present invention discloses a process for supporting computer infrastructure, comprising integrating, hosting, maintaining and deploying computer-readable code (e.g., code 104) into a computer system (e.g., computer system 102), wherein the code in combination with the computer system is capable of performing a process for automatically verifying database changes.

In another embodiment, the invention provides a business method that performs the process steps of the invention on a subscription, advertising and/or fee basis. That is, a service provider, such as a Solution Integrator, can offer to create, maintain, support, etc. a process for automatically verifying database changes. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 3, the sequence diagrams in FIGS. 2 and 7, and the block diagrams in FIGS. 1, 6, and 8 illustrate the architecture, functionality, and operation of possible implementations of systems, methods, and computer program products according to various embodiments of the present invention. In this regard, each block in the flowchart, sequence diagram or block diagrams may represent a module, segment, or portion of code (e.g., code 104), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams, sequence diagrams and/or flowchart illustration, and combinations of blocks in the block diagrams, sequence diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. For example, the names provided herein for methods, classes, parameters, objects and processes are merely examples; the present invention contemplates that one or more of the aforementioned names may be changed to one or more different names. Accordingly, the appended claims are intended to encompass all such modifications and changes as fall within the true spirit and scope of this invention.

What is claimed is:

1. A computer-implemented method of automatically verifying a change to a target database, said method comprising:
   a computer system receiving an input file that indicates a change to a target database, wherein said input file includes a test query for said target database and a predefined output expected from executing said test query on said target database;
   said computer system automatically executing said test query on said target database subsequent to said receiving said input file;
   said computer system retrieving an actual output resulting from said automatically executing said test query;
   said computer system comparing said actual output with said predefined output;
   said computer system automatically identifying a mismatch between said actual output and said predefined output based on a result of said comparing said actual output with said predefined output; and
   said computer system storing an indication of a failure in a computer data storage unit, wherein said failure indicates said mismatch, and wherein said failure further indicates that said change to said target database is invalid and said change to said target database initiates a defect in an application coupled to said target database.

2. The method of claim 1, wherein said receiving said input file comprises receiving said input file that further indicates a second change to said target database and that further includes a second test query for said target database and a second predefined output expected from executing said second test query on said target database, and wherein said method further comprises:
   said computer system automatically executing said second test query subsequent to said receiving said input file;
   said computer system retrieving a second actual output resulting from said automatically executing said second test query;
   said computer system comparing said second actual output with said second predefined output; and
   said computer system automatically identifying a match between said second actual output and said second predefined output based on a result of said comparing said second actual output with said second predefined output.

3. The method of claim 2, further comprising collectively verifying a plurality of changes to said target database via said input file, wherein said collectively verifying includes said automatically identifying said mismatch between said actual output and said predefined output and said automatically identifying said match between said second actual output and said second predefined output, and wherein said plurality of changes includes said change to said target database and said second change to said target database.

4. The method of claim 1, further comprising determining said application is in an environment included in a predefined set of one or more environments, wherein said receiving said input file, said automatically executing said second query, said retrieving said actual output resulting from said automatically executing said test query, said comparing said actual output with said predefined output, said automatically identifying said mismatch, and said storing said indication of said failure are performed in response to said determining said application is in said environment, wherein each environment of said predefined set of one or more environments is selected from the group consisting of a local environment, a development environment, an integration environment, a testing environment, and a staging environment, and wherein each environment of said predefined set of one or more environments precedes a production environment.

5. The method of claim 1, wherein said method further comprises:
receiving a first target environment identifier that identifies a first target environment of said application;
selecting a first set of one or more test queries and a first set of one or more expected outputs from said input file, wherein said input file associates a first valid environment identifier with said first set of one or more test queries and with said first set of one or more expected outputs, and wherein said selecting said first set of one or more test queries and said first set of one or more expected outputs is based on said first target environment identifier matching said first valid environment identifier;
automatically executing said first set of one or more test queries in said first target environment;
automatically verifying said change based on a comparison of a first set of one or more actual outputs with said first set of one or more expected outputs, wherein said first set of one or more actual outputs is a result of said automatically executing said first set of one or more test queries in said first target environment;
subsequent to said automatically verifying said change based on said comparison of said first set of one or more actual outputs with said first set of one or more expected outputs, receiving a second target environment identifier that identifies a second target environment of said application;
selecting a second set of one or more test queries and a second set of one or more expected outputs from said input file, wherein said input file associates a second valid environment identifier with said second set of one or more test queries and with said second set of one or more expected outputs, and wherein said selecting said second set of one or more test queries and said second set of one or more expected outputs is based on said second target environment identifier matching said second valid environment identifier;
automatically executing said second set of one or more test queries in said second target environment; and
automatically verifying said change based on a comparison of a second set of one or more actual outputs with said second set of one or more expected outputs, wherein said second set of one or more actual outputs is a result of said automatically executing said second set of one or more test queries in said second target environment.

6. The method of claim 1, wherein said receiving said input file includes receiving said input file that indicates a change to one or more master data items included in said target database.

7. The method of claim 1, wherein said receiving said input file includes receiving said input file that indicates a change to one or more meta data items that specify one or more attributes of said target database.

8. The method of claim 1, wherein said receiving said input file includes receiving said input file that indicates a change to a trigger of said target database, wherein said method further comprises invoking said trigger via said input file, and wherein a result of said invoking said trigger is a functional verification of said change to said trigger.

9. The method of claim 1, further comprising changing said target database to provide said change to said target database, wherein said automatically executing said test query is performed independently of said changing said target database.

10. The method of claim 1, further comprising receiving a modification of said change to said target database, wherein said modification of said change corrects said defect.

11. The method of claim 1, further comprising, prior to said receiving said input file:
receiving an input query that provides said change to said target database;
extracting a first SQL command from said input query;
retrieving an entry in a reverse dictionary file based on said first SQL command, wherein said entry associates said first SQL command with a second SQL command that is a reverse of said first SQL command;
extracting said second SQL command from said entry;
automatically generating said test query so that said test query includes said second SQL command; and
storing said test query in said input file.

12. The method of claim 11, further comprising determining that said first SQL command is an SQL insert command, an SQL update command, or an SQL delete command, wherein said retrieving said entry in said reverse dictionary includes retrieving said entry that associates said first SQL command with an SQL select command.

13. The method of claim 11, further comprising determining that said first SQL command is an SQL create command, wherein said retrieving said entry in said reverse dictionary includes retrieving said entry that associates said first SQL command with an SQL describe command.

14. A computer system comprising a processor coupled to a computer-readable memory unit, said memory unit comprising a software application, said software application comprising instructions that when executed by said processor implement the method of claim 1.

15. A computer program product, comprising a computer-readable, tangible storage device having a computer-readable program code stored therein, said computer-readable program code containing instructions configured to be executed by a processor of a computer system to implement a method of automatically verifying a change to a target database, said method comprising:
receiving an input file that indicates a change to a target database, wherein said input file includes a test query for said target database and a predefined output expected from executing said test query on said target database;
automatically executing said test query on said target database subsequent to said receiving said input file;

retrieving an actual output resulting from said automatically executing said test query;
comparing said actual output with said predefined output;
automatically identifying a mismatch between said actual output and said predefined output based on a result of said comparing said actual output with said predefined output; and
storing an indication of a failure in a computer data storage unit, wherein said failure indicates said mismatch, and wherein said failure further indicates that said change to said target database is invalid and said change to said target database initiates a defect in an application coupled to said target database.

16. The program product of claim 15, wherein said receiving said input file comprises receiving said input file that further indicates a second change to said target database and that further includes a second test query for said target database and a second predefined output expected from executing said second test query on said target database, and wherein said method further comprises:
automatically executing said second test query subsequent to said receiving said input file;
retrieving a second actual output resulting from said automatically executing said second test query;
comparing said second actual output with said second predefined output; and
automatically identifying a match between said second actual output and said second predefined output based on a result of said comparing said second actual output with said second predefined output.

17. The program product of claim 15, wherein said method further comprises, prior to said receiving said input file:
receiving an input query that provides said change to said target database;
extracting a first SQL command from said input query;
retrieving an entry in a reverse dictionary file based on said first SQL command, wherein said entry associates said first SQL command with a second SQL command that is a reverse of said first SQL command, wherein said second SQL command is an SQL select command if said first SQL command is an SQL insert command, an SQL update command, or an SQL delete command, and wherein said second SQL command is an SQL describe command if said first SQL command is an SQL create command;
extracting said second SQL command from said entry;
automatically generating said test query so that said test query includes said second SQL command; and
storing said test query in said input file.

18. A process for supporting computing infrastructure, said process comprising providing at least one support service for at least one of creating, integrating, hosting, maintaining, and deploying computer-readable code in a computer system, wherein the code in combination with the computer system is capable of performing a method of automatically verifying a change to a target database, said method comprising:
receiving an input file that indicates a change to a target database, wherein said input file includes a test query for said target database and a predefined output expected from executing said test query on said target database;
automatically executing said test query on said target database subsequent to said receiving said input file;
retrieving an actual output resulting from said automatically executing said test query;
comparing said actual output with said predefined output;
automatically identifying a mismatch between said actual output and said predefined output based on a result of said comparing said actual output with said predefined output; and
storing an indication of a failure in a computer data storage unit, wherein said failure indicates said mismatch, and wherein said failure further indicates that said change to said target database is invalid and said change to said target database initiates a defect in an application coupled to said target database.

19. The process of claim 18, wherein said receiving said input file comprises receiving said input file that further indicates a second change to said target database and that further includes a second test query for said target database and a second predefined output expected from executing said second test query on said target database, and wherein said method further comprises:
automatically executing said second test query subsequent to said receiving said input file;
retrieving a second actual output resulting from said automatically executing said second test query;
comparing said second actual output with said second predefined output; and
automatically identifying a match between said second actual output and said second predefined output based on a result of said comparing said second actual output with said second predefined output.

20. The process of claim 18, wherein said method further comprises, prior to said receiving said input file:
receiving an input query that provides said change to said target database;
extracting a first SQL command from said input query;
retrieving an entry in a reverse dictionary file based on said first SQL command, wherein said entry associates said first SQL command with a second SQL command that is a reverse of said first SQL command, wherein said second SQL command is an SQL select command if said first SQL command is an SQL insert command, an SQL update command, or an SQL delete command, and wherein said second SQL command is an SQL describe command if said first SQL command is an SQL create command;
extracting said second SQL command from said entry;
automatically generating said test query so that said test query includes said second SQL command; and
storing said test query in said input file.

* * * * *